United States Patent
Burns, Sr. et al.

(10) Patent No.: US 10,710,128 B2
(45) Date of Patent: Jul. 14, 2020

(54) HYDROGEN SULFIDE ABSORBING ALTERNATIVE LANDFILL COVER MATERIAL

(71) Applicants: Richard S. Burns, Sr., Elkins Park, PA (US); Allen T. Burns, Jenkintown, PA (US)

(72) Inventors: Richard S. Burns, Sr., Elkins Park, PA (US); Allen T. Burns, Jenkintown, PA (US)

(*) Notice: Subject to any disclaimer, the term of this patent is extended or adjusted under 35 U.S.C. 154(b) by 0 days.

(21) Appl. No.: 16/054,710

(22) Filed: Aug. 3, 2018

(65) Prior Publication Data

US 2019/0039105 A1 Feb. 7, 2019

Related U.S. Application Data

(60) Provisional application No. 62/540,787, filed on Aug. 3, 2017.

(51) Int. Cl.

| | | |
|---|---|---|
| *B03B 9/06* | (2006.01) | |
| *B09B 1/00* | (2006.01) | |
| *C04B 18/26* | (2006.01) | |
| *C04B 18/22* | (2006.01) | |
| *C04B 18/16* | (2006.01) | |
| *C04B 30/00* | (2006.01) | |
| *C04B 111/00* | (2006.01) | |

(52) U.S. Cl.
CPC .............. *B09B 1/004* (2013.01); *C04B 18/16* (2013.01); *C04B 18/22* (2013.01); *C04B 18/26* (2013.01); *C04B 30/00* (2013.01); *B01J 2220/4887* (2013.01); *B03B 9/065* (2013.01); *C04B 2111/00775* (2013.01)

(58) Field of Classification Search
CPC ......... B09B 1/004; B03B 9/065; C04B 18/16; C04B 18/22; C04B 18/26
See application file for complete search history.

(56) References Cited

U.S. PATENT DOCUMENTS

| | | | | |
|---|---|---|---|---|
| 3,635,409 | A | * | 1/1972 | Brewer ............... B03B 9/06 241/43 |
| 5,054,406 | A | * | 10/1991 | Judd ................... C04B 7/24 110/224 |
| 5,090,843 | A | * | 2/1992 | Grigsby ............. B09B 1/004 405/129.9 |
| 5,181,803 | A | * | 1/1993 | Smith ............... B03B 9/065 241/43 |
| 5,288,171 | A | * | 2/1994 | Smith ............... B03B 9/065 241/DIG. 38 |
| 5,468,291 | A | | 11/1995 | Waterson et al. |
| 5,855,664 | A | | 1/1999 | Bielecki et al. |

(Continued)

OTHER PUBLICATIONS

Siefers, Wang, Sindt, Dunn, McElvogue, Evans, and Ellis, (2010) Water Environmental Federation Technical Exhibition & Conference. "A Novel and Cost-Effective Hydrogen Sulfide Removal Technology Using Tire Derived Rubber Particles."

*Primary Examiner* — Benjamin F Fiorello
(74) *Attorney, Agent, or Firm* — Patent Law Associates

(57) ABSTRACT

A reformulated barrier material for use as an alternative cover for landfills made from recycled materials which may comprise construction and/or demolition debris to which is added tire derived rubber particles to inhibit the release of hydrogen sulfide gas through the reformulated barrier material to the surrounding atmosphere from the landfill beneath.

10 Claims, 2 Drawing Sheets

(56) References Cited

U.S. PATENT DOCUMENTS

| | | | |
|---|---|---|---|
| 5,897,946 A * | 4/1999 | Nachtman | E02B 3/12 405/17 |
| 5,975,801 A * | 11/1999 | Burns, Sr. | B03B 9/065 241/24.1 |
| 6,071,043 A | 6/2000 | Hunt | |
| 6,994,491 B2 | 2/2006 | Kittle | |
| 7,056,537 B2 | 6/2006 | Weschler | |
| 7,284,930 B2 * | 10/2007 | Shi | B09B 1/004 106/724 |
| 2003/0213859 A1 * | 11/2003 | Simon | B03B 9/061 241/19 |
| 2008/0085160 A1 | 4/2008 | Taylor | |
| 2010/0074688 A1 * | 3/2010 | Renaud | E02D 31/006 405/129.9 |
| 2012/0114736 A1 | 5/2012 | Bishop et al. | |
| 2017/0359967 A1 * | 12/2017 | Tetrault | A41D 31/02 |

* cited by examiner

HYDROGEN SULFIDE ABSORBING ALTERNATIVE LANDFILL COVER MATERIAL

CROSS REFERENCE TO RELATED APPLICATIONS

This application claims the priority benefit of U.S. provisional patent application Ser. No. 62/540,787 filed on Aug. 3, 2017.

BACKGROUND OF THE INVENTION

The present invention relates to an alternative cover for landfills, and more particularly, is directed to an alternative daily cover for landfills using recycled materials which meets the Department of Environmental Protection requirements for a daily cover and inhibits the release of hydrogen sulfide gas therefrom.

State and federal environmental regulations generally require operators of landfills to periodically cover exposed solid waste, typically at the end of each working day or at the end of every 24 hours. The daily cover is used to prevent vectors, odors, blowing, litter and other nuisances from the landfill and is also required to prevent fires and to allow loaded vehicles to successfully maneuver on landfill after the cover material has been placed. Generally, the layer of cover material is required to be a minimum of 6 inches thick and a supply of the cover must be maintained on site and may be left in place for up to seven days. An intermediate cover is necessary for longer durations and must be a minimum of 12 inches thick. Materials used for intermediate covers must be capable of sustaining vegetation in some states, at least temporarily, prior to receiving a final cover in order to protect against corrosion and sedimentation. The daily cover requirements vary somewhat from state to state, but the material used is generally known in the industry as "daily cover", or "periodic cover" when the interval is more than one day (for example two or three days). As used herein "daily cover" is intended to include both daily and periodic cover for landfills such as municipal solid waste (MSW) landfills, rubble landfills, land clearing debris landfills, and industrial waste landfills.

A significant constituent of many landfills is construction and demolition debris may include percentages of sulfate containing material. Under the anaerobic conditions in the typical landfill, sulfate-reducing bacteria produce hydrogen sulfide ($H_2S$) from the sulfate containing materials and the organic carbon in other waste material within the landfill. While daily cover is effective at containing debris and the like within the landfill, it is ineffective for trapping or containing the biogas within the landfill. Additionally, some alternative cover materials may comprise significant quantities of construction and demolition debris containing concentrations of sulfate containing materials which further promotes the formation of hydrogen sulfide gas. Hydrogen sulfide gas escaping from the landfill creates an offensive odor for people near the landfill as well as nearby neighbors. Consequently, public opposition to landfills by proximate property owners is generally high due to the expected odor problems, among other concerns. It would also be desirable to provide an alternate intermediate cover that could absorb or otherwise contain the hydrogen sulfide gas thereby reducing or eliminating the odor problem. It would also be advantageous is the absorbing alternate intermediate cover could continue to be produced using primarily recycled materials.

SUMMARY OF THE INVENTION

Accordingly, the present invention, in any of the embodiments described herein, may provide one or more of the following advantages:

It is an object of the present invention to provide a material and a method for producing the material for use as an alternative daily cover for landfills using recycled materials and includes constituents that inhibit the release of hydrogen sulfide gas from the landfill beneath through the alternative cover material or from the alternative cover itself to the surrounding atmosphere. A landfill cover such as that produced under U.S. Pat. No. 5,975,801 serves as the base for the daily cover material. To this material is added rubber particles, often referred to as crumb or sized rubber, to create a generally homogenous mixture of the known alternative daily cover material formed from recycled materials and sized rubber. The homogenous mixture is referred to as reformulated daily barrier material. The reformulated barrier material is applied to a landfill as is conventional practice. The sized rubber material has been shown to absorb hydrogen sulfide at least as effectively as conventional activated carbon or steel wool media of conventional hydrogen sulfide scrubber processes.

It is a further object of the present invention to provide a reformulated barrier material for use as an alternative daily cover for landfills that blends rubber particles into an alternative landfill cover material to absorb and contain hydrogen sulfide gas that may be generated by the alternative daily cover material itself or within the underlying landfill material. The reformulated barrier material effectively absorbs hydrogen sulfide gas and is periodically regenerated by exposure to water which has been discovered to transport the absorbed hydrogen sulfide material back into the landfill material rather than allowing release of the gas. Additionally, as the reformulated barrier material is applied regularly to the landfill as part of a daily cover regimen, the sized rubber material within the reformulated barrier material is regularly replenished to maintain hydrogen sulfide gas absorption capability.

Another object of the present invention is to provide a reformulated barrier material comprising construction and/or demolition debris for use as an alternative daily cover for landfills that blends tire derived rubber particles into the alternative daily cover material to absorb any hydrogen sulfide gas generated by the alternative daily cover material itself so that the release of hydrogen sulfide gas from the landfill is not worsened by the use of the reformulated barrier material. A minimum required concentration of sized rubber material may be determined by examining the composition of the alternative cover material and the composition of materials buried in the landfill itself.

It is a still further object of the present invention to provide a reformulated barrier material for use as landfill daily cover that effectively absorbs hydrogen sulfide gas and is inexpensive of manufacture, ecologically sound, and simple and effective to use.

These and other objects are achieved in accordance with the present invention by providing a reformulated barrier material for use as an alternative daily cover for landfills made from recycled materials which may comprise construction and/or demolition debris to which is added sized rubber particles to inhibit the release of hydrogen sulfide gas through the reformulated barrier material to the surrounding atmosphere from the alternative cover material and/or the landfill materials beneath.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Figure 1:
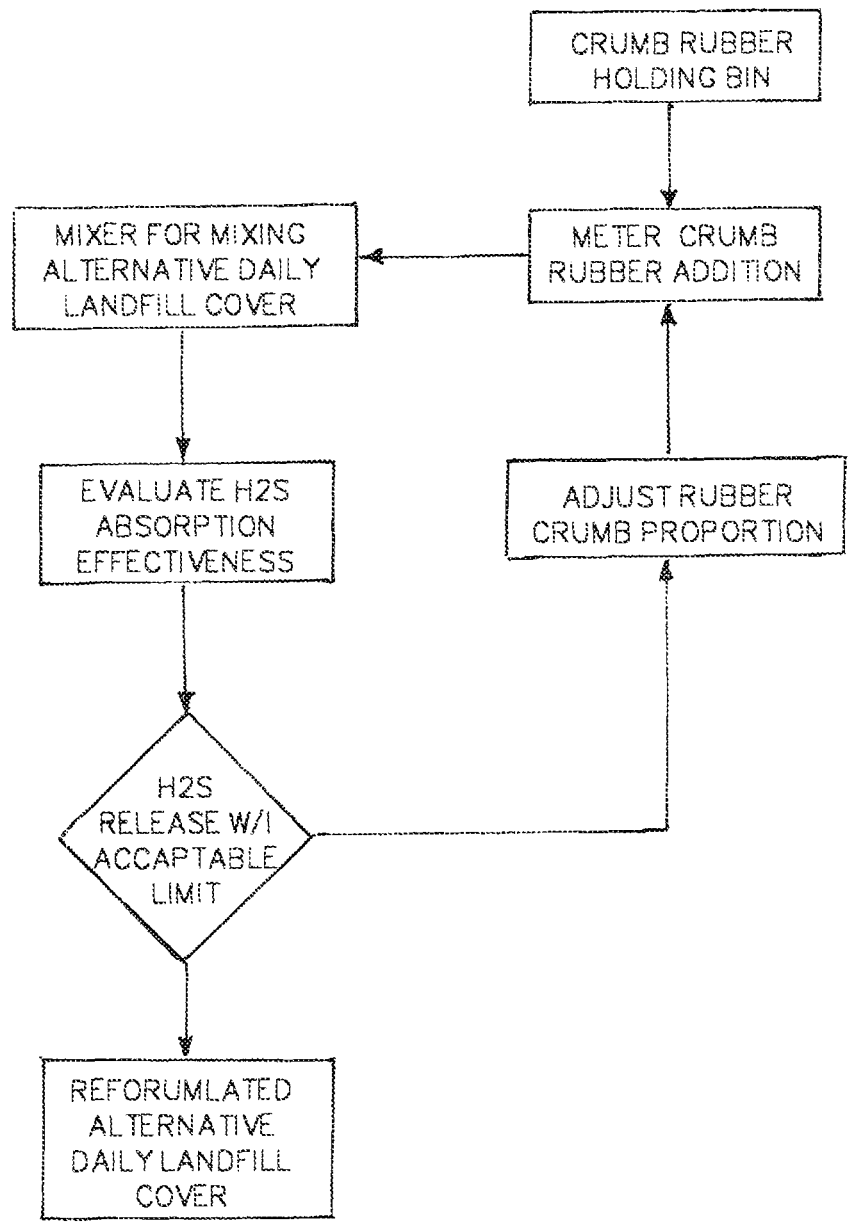
FIG. 1 provides an abbreviated flow diagram for the processing of a reformulated barrier material.

Many of the processes and other means and components utilized in this invention are widely known and used in the field of the invention described, and their exact nature or type is not necessary for an understanding and use of the invention by a person skilled in the art, and they will not therefore be discussed in significant detail. The various constituents of the composition shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Testing in scrubbers for effluent discharges from anaerobic digesters used in wastewater treatment plants has shown that the tire derived crumb rubber material can be used as an alternative scrubber media to trap hydrogen sulfide gas present in the gaseous effluent and prevent its release to the atmosphere (and the related malodor). The application in scrubbers directs the full effluent stream to a bed comprising primarily of the crumb rubber material. See, A Novel and Cost-Effective Hydrogen Sulfide Removal Technology Using Tire Derived Rubber Particles Siefers, et al., *Proceedings of the Water Environmental Federation*, (2010), Session 61-70, pp. 4597-4622 for additional detail on testing in wastewater treatment effluents, the entirety of which is incorporated herein by reference.

Background on the requirements for applying a daily cover material onto active landfills, a composition comprising recycled construction and demolition (C&D) debris that is suitable for use as an alternative to soil for a daily cover material, and a method for producing such an alternative cover material is disclosed in U.S. Pat. No. 5,975,801 issued on Nov. 2, 1999 to Burns, Sr., et al, the descriptive portions of which are incorporated by reference herein.

One primary requirement for the reformulated alternative daily cover material is that it trap noxious odors emanating from the buried fill material and, by extension, the alternative daily cover material itself should not generate noxious odors. It is known that sulfate within the fill material or the alternative cover material may be attacked by sulfate eating bacteria when exposed to water which produces hydrogen sulfide as a waste product. Construction debris is a significant source of sulfates in landfill debris. It may also present in significant quantities in the alternative cover material produced in the method disclosed in the Burns patent.

If the reformulated barrier material is to be used as an intermediate cover material, it must be capable of sustaining vegetation. In these instances, proportions of C&D debris and other constituents of the alternative cover material (e.g., soil) must be monitored and maintained within specified limits to assure that the resulting intermediate cover material is a capable vegetation-sustaining soil.

The present invention modifies the known alternative daily cover material composition by adding a quantity of tire derived rubber particles, also known as sized or crumb rubber, and mixing it therewith to obtain a generally homogenous mixture of the alternative cover material and rubber. While tire derived rubber materials are most readily available and thus preferred, other types of rubber debris may be equally effective and are contemplated within the scope of the invention. As used herein, the combined alternative cover material and rubber mixture is referred to as reformulated barrier material. Placing reformulated barrier material on a landfill serves as a filtering media through which any off-gases from the landfill must pass. Off-gases containing hydrogen sulfide interact with the sized rubber material included in the barrier material during this process and the hydrogen sulfide gas is trapped (absorbed by the rubber) to prevent its passage through the reformulated barrier material thereby reducing malodorous odor release from the landfill. The captured gas reacts with water entering the landfill via precipitation eventually decays to elemental sulfur which is washed back into the landfill. The regenerative nature of the process provides capability to trap hydrogen sulfide gasses within the landfill cover material potentially for as long as the cover material remains in place.

The process for producing the known alternative cover material includes monitoring the constituent components of the alternative cover material and adjusting the relative proportions to maintain a desirable end product. The proportion of sized rubber added to the mixture may be varied depending upon the proportion of materials in the mixture known to cause hydrogen sulfide generation, primarily wallboard waste. The proportion of rubber in the mixture may also be varied when, for example, the landfill is known to contain higher than normal concentrations of waste that lead to the generation of hydrogen sulfide gas. The mixture may also be modified based on feedback from a landfill operator based on the effectiveness, or lack thereof, of the reformulated barrier material. In this manner, the reformulated barrier material may be customized for best results with the landfill and/or other constituents in the barrier material and to optimize the use of the sized rubber material. While most other constituents of the alternative cover material represent waste streams, tire-derived sized rubber is not a constituent of a normal construction and demolition waste stream and may represent an expense to the process.

Analysis of the alternative cover material shows calcium sulfate ($CaSO_4$) concentrations can range from roughly 3,000 parts-per-million (ppm) to over 20,000 ppm. It is possible for $CaSO_4$ concentrations in the material composition to be essentially a trace, but typical blends include measurable amounts of sulfate containing material and thus measurable concentrations of calcium sulfate. Testing has shown that with a calcium sulfate concentration of 8,000 ppm, the addition of sized rubber to a level constituting 28% of the blend provides sufficient hydrogen sulfide absorbing capability to prevent free release of the hydrogen sulfide gas emanating from the reformulated barrier material. This correlates to rubber proportions in the range of approximately 1:2 (1 part rubber to 2 parts alternative cover material) needed to absorb all the hydrogen sulfide potentially generated and does not account for the slower nature of the gas generation nor the regenerative capability of the fill. In practice, significantly lower crumb rubber concentrations on the order of approximately 0.5 to approximately 35% by volume have been shown to be effective. The preferred balance of hydrogen sulfide absorption capability, economics, and overall quality of the reformulated alternative cover material is envisioned to be in the range of approximately 5 to approximately 8% of the mixture, by volume.

The concentration of sized rubber may be increased to account for higher calcium sulfate levels in the barrier material and/or the calcium sulfate in the underlying landfills. In the event the reformulated barrier material does not include a sufficient concentration of sized rubber to absorb the hydrogen sulfide generation rate, the rubber concentration can be increased in subsequent batches as cover material is generally applied daily. The upper rubber concentration limit is determined primarily by economics unless the material is to be used as an intermediate cover in which case the limit is whether the resulting reformulated barrier material will sustain vegetation. While sized rubber proportions of 1:1 may provide significant hydrogen sulfide absorbing capability, the capability comes at the expense of other requirements of the alternative cover material. Concentrations up to 100% sized rubber particles provide the necessary hydrogen sulfide absorbing capability, but fail to take advantage of the C&D waste stream and dramatically increase the demand for the sized rubber material. The result is not economically sustainable. Furthermore, a cover layer comprising such high proportions of sized rubber may also introduce other hazards to the landfill, including environmental contamination and fire.

The method for producing the reformulated barrier material is as described in the Burns, Sr. patent referenced above with the addition of a third feed stock comprising sized, tire-derived rubber material. Briefly stated, the process for producing a product for use as a reformulated alternative cover material for landfills using recycled materials comprises the steps:

(a) receiving construction and demolition debris in a first area;
(b) receiving clean fill in a second area;
(c) receiving sized rubber material in a third area;
(d) positive sorting at least one of masonry products, concrete, bricks, cinder block, rocks, and asphalt from the construction and demolition debris from the first area;
(e) positive sorting a remaining portion of the construction and demolition debris from step (d) to remove recyclable materials including at least one of cardboard, wood, fiber, ferrous metal and non-ferrous metal;
(f) negative sorting a remainder of the construction and demolition debris from step (e) to remove materials other than wood, roofing material, wallboard material, plaster, plaster board and insulating board to form a first feed stock component;
(g) grinding the first feed stock component to a desired particle size of up to approximately six inches to form a first feed stock;
(h) mixing the at least one of the masonry products, concrete, bricks, cinder block, rocks and asphalt with the clean fill from the second area to form a second feed stock component;

(i) grinding the second feed stock component to a desired particle size of up to approximately six inches to form a second feed stock;
(j) blending the first and second feed stocks in a proportion of approximately 2:1 to approximately 5:1 by weight to form an alternative cover material for landfills using recycled material; and
(k) blending a feed of sized rubber material into the alternative cover material in a proportion of approximately 5 percent to approximately 8 percent by volume to form a reformulated barrier material.

Figure 2:
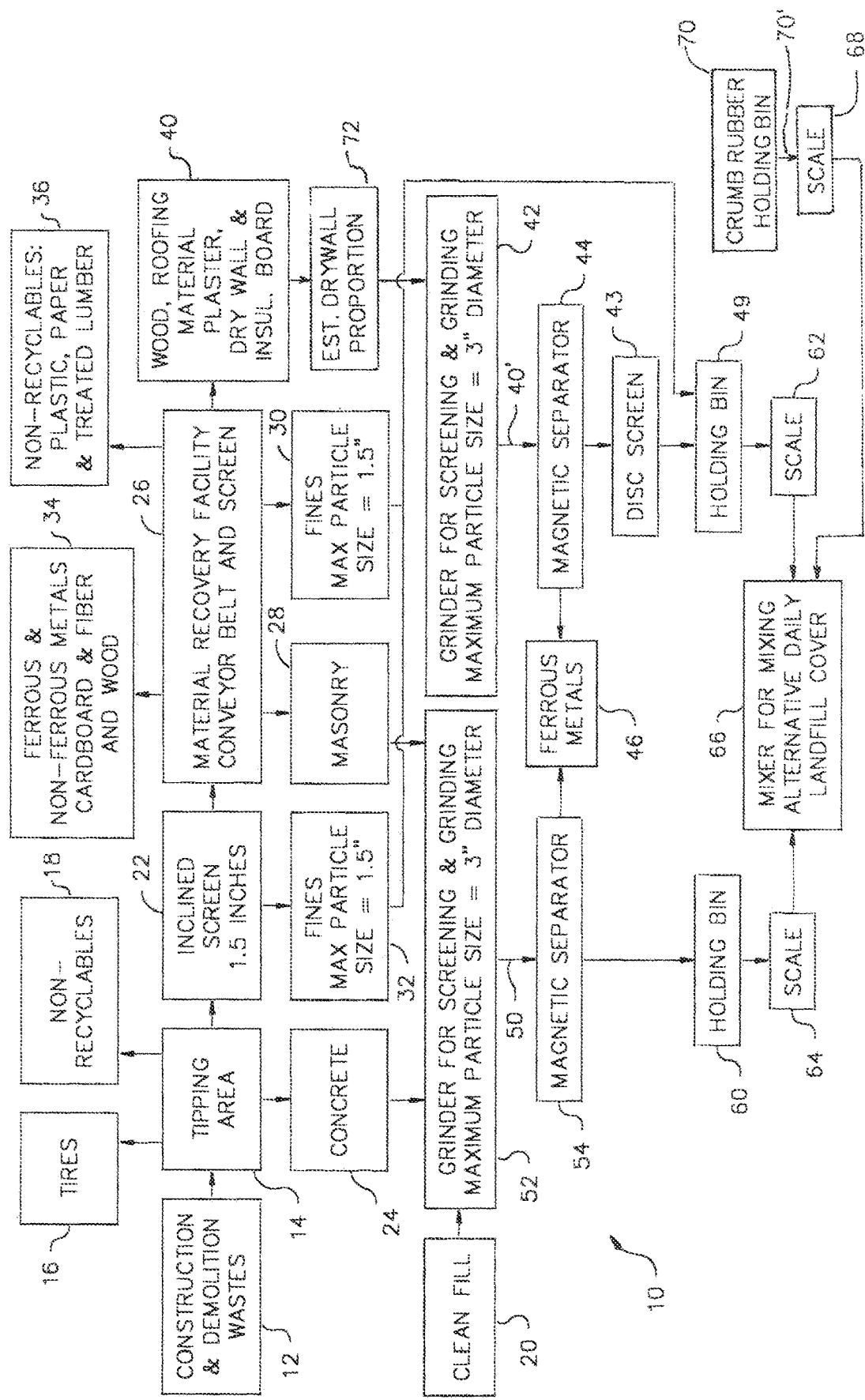
FIG. 2 is a flow diagram showing the processing stages used for recycling construction and demolition debris into a reformulated alternative landfill daily cover material.

Referring now to FIG. 2, a flow diagram of the process carried out by a system 10 for forming a reformulated barrier material for landfills is shown. The system 10 is used in a process for producing a product for use as an alternative daily cover material or intermediate cover for landfills using recycled material. To the extent that the main difference between a daily cover and an intermediate cover is maximum particle size, both types of alternative cover material will be generally referred to as daily cover for the purposes of the present description. However, when the reformulated barrier material produced by the present invention is to be used as an intermediate cover, it is ground to a maximum particle size of 1 inch or less (generally ½ to ¾ inch), as explained in detail below and its proportion monitored to assure the ability of the reformulated intermediate cover material to sustain vegetation.

As shown in FIG. 2, the process begins with the delivery of construction and demolition debris, represented by block 12, which is received in a first, tipping area, represented by block 14. The tipping area 14 is preferably a concrete floor where the construction and demolition debris 12 is unloaded such that it can be inspected. Unacceptable materials and loads of material which are suspected to contain chemical or other contamination can be rejected and reloaded on the same vehicle without contaminating the construction and demolition debris 12 which was previously received which has been or is being processed. Additionally, using a concrete surface allows the tipping area 14 to be cleaned on a daily basis as well as preventing potential contaminants from entering the ground. However, it will be recognized by those skilled in the art from the present disclosure that other surfaces could be used for the tipping area 14, if desired.

As shown in FIG. 2, the process begins with the delivery of construction and demolition debris, represented by block 12, which is received in a first, tipping area, represented by block 14. The tipping area 14 is preferably a concrete floor where the construction and demolition debris 12 is unloaded such that it can be inspected. Unacceptable materials and loads of material which are suspected to contain chemical or other contamination can be rejected and reloaded on the same vehicle without contaminating the construction and demolition debris 12 which was previously received which has been or is being processed. Additionally, using a concrete surface allows the tipping area 14 to be cleaned on a daily basis as well as preventing potential contaminants from entering the ground. However, it will be recognized by those skilled in the art from the present disclosure that other surfaces could be used for the tipping area 14, if desired.

The accepted construction demolition debris 12 is subjected to a combination of hand and mechanical sorting which includes both positive and negative sorting as described in more detail below. As noted in block 16, tires are presorted from the construction and demolition debris 12 in the tipping area 14 such that they can be recycled or processed separately. Though not shown, tires may be returned to the process in the form of sized tire-derived rubber material which is stored in holding bin 70 for addition to the reformulated alternative cover mixture. Additionally, non-recyclables are preferably sorted from the tipping area as shown in block 18. For example, materials such as rugs and plastic sheets are removed. Other large materials, such as ferrous and nonferrous metals, including structural members from buildings, are preferably removed from the construction and demolition debris 12 in the first, tipping area 14 in order to avoid unnecessarily moving these larger articles through the sorting process.

An additional component of the alternative daily cover material produced by the system 10 is cleanfill 20, such as soil or rock, which is delivered to a second receiving area 20.

The construction and demolition debris 12 from the tipping area 14 is preferably moved over an inclined screen 22, where fine particulate matter ("fines") 32 having a particle size or approximately 1.5 inches or less is screened from the construction and demolition debris 12. This is done to ensure that the fines are not further reduced in size during the grinding and shredding operations which are described below, resulting in a better end product and also reducing the amount of material which can later become air born.

Preferably, masonry products, concrete, bricks, cinder blocks, rocks, asphalt, and other similar materials are positive sorted from the construction and demolition debris 12 as it is carried by a conveyor 26 from the first area 14. Large concrete or other masonry or similar articles 24 may be removed directly from the tipping area 14, and smaller pieces of the concrete and masonry products 28 may be removed by positive sorting from a raised conveyor belt and screen 26. Additional fines 30 may also be removed from the conveyor belt and screen 26 for the reasons noted above. These fines 30 also have a maximum particle size of approximately 1.5 inches, and are moved along with the fines 32 removed from the inclined screen in block 22.

The remaining portion of the construction and demolition debris 12 which is being processed along the conveyor belt and screen 26 is positive sorted to remove additional recyclable materials including at least one of cardboard, fiber, untreated wood, ferrous and nonferrous metals, and other similar desirable materials which are removed and recycled as indicated by block 34. These materials can be removed by manual sorting or at least partially automated sorting, such as magnetic or float tank separation, if desired.

The remainder of the construction and demolition debris 12 is then negative sorted to remove materials other than the remaining wood (which was not determined to be recyclable in the previous step), drywall, roofing material, plaster, plasterboard and insulating board. The negative sorting step preferably includes removing at least one of ferrous and nonferrous metals, cardboard, fiber, treated wood, plastics and paper, which are not desirable as a component of the alternative daily cover material. This removes the bulk of combustible material from the remaining material which will be used to form the alternative daily cover material.

The resulting product from the sorted construction demolition debris 12 then consists of wood, roofing material, plaster, plasterboard and insulating board 40 which forms a first feed stock component which may also be referred to as "modified demolition debris". The proportion of wallboard material constituency in the modified demolition debris may be estimated 72, whether by weight, visual, or other means.

The first feed stock component 40 is ground by a grinder 42 in a grinding/screening operation to form a first ground feed stock component 40' which can include materials having a particle size of up to approximately 6 inches. Depending upon the particular application, the particle size of the first ground feed stock 40' can be 3 inches or less, as shown in FIG. 1. It will be recognized by those skilled in the art that the particle size of the first feed stock 40' can be larger or smaller, if desired, but generally 6 inches or less is a requirement for an alternative daily cover material for landfills.

In order to ensure that the first ground feed stock 40' has a maximum particle size as approximately 6 inches, the first ground feed stock component is screened using a disc screen 53, and the oversized materials separated from the ground and screened first feed stock 40' are fed back to the beginning of the sorting process to the disc screen 22 for resorting. In order to avoid jamming the grinding equipment, the oversized material separated from the ground and screened first feed stock 40' are preferably remixed in a proportion of 5 percent or less.

The first feed stock 40' which has been screened to eliminate oversized particles, then passes through a magnetic separator 44 where ferrous materials from the first feed stock 40' are removed. The ferrous materials 46 collected from the magnetic separator 44 are preferably recycled. The first feed stock 40' then passes to a holding bin 49 where it is held for further processing.

Either concurrently with or separately from the processing of the first feed stock 40', the at least one of the masonry products, concrete, bricks, cinder block, rocks, asphalt and other similar products 24, 28 are mixed with the cleanfill 20 to form a second feed stock component. The second feed stock component is ground in a grinding apparatus 52 to a desired particle size of up to approximately 6 inches to form a second feed stock 50. Preferably, the second feed stock 50 is screened to make sure that no oversize debris which could not be reduced to the proper size is removed. Since the masonry products, concrete, bricks, cinder block, rocks, asphalt and other similar products 24, 28 and the cleanfill can be reduced to the desired particle size without any difficulty, this screening basically removes any debris which cannot be reduced, which is generally unwanted materials 55, such as plastic, fiber or wood, which are disposed of separately. In a preferred embodiment of the invention, the maximum particle size of the second feed stock is 3 inches. However, it will be recognized by those skilled in the art that larger or smaller sizes can be used, depending upon the particular application. Ferrous materials 46 are then separated from the second ground feed stock 50 using a magnetic separator 54, and the ferrous materials 46 are collected for recycling. The second ground feed stock 50 may also be passed through a screen (not shown) in order to insure that the maximum particle size is less than 6 inches, however, this is generally not required. The second feed stock 50 is fed to a second holding bin 60.

In order to form the reformulated alternative daily landfill cover, the first and second feed stocks 40', 50 are removed from the holding bins 49, 60, respectively and are weighed on scales 62, 64, respectively. The first and second feed stocks 40', 50 are provided in a proportion of approximately 2:1 to approximately 5:1 by weight and are blended in a mixer 66 to form an alternative daily cover material for landfills using the recycled construction demolition debris 12. The exact blend can be varied depending upon the resulting properties desired, with the resultant product having a high degree of uniformity in terms of particle size and composition.

To the blend is added a quantity of sized rubber material from the rubber feed stock 70' in a proportion of approximately 5% to approximately 30% by volume blended with the first and second feedstocks in mixer 66. An assessment of the amount of sulfate-containing waste in the first feed stock can be used to determine the proportion of sized rubber material to be added to the blend to neutralize hydrogen sulfide generated from the calcium sulfate contained therein. The rubber may be weighed on scale 68 and added to mixer 66 during the blending of the first and second feed stocks. Alternatively, a fixed-volume container may be used to introduce the rubber based on the batch size in the mixer. The rubber proportion may be varied depending upon the resulting properties desired, but primarily dependent upon the sulfate-containing material fraction in the blend. The degree of hydrogen sulfide-generating waste in the landfill may also be considered when determining the quantity of sized rubber material to add to the mixture.

It will be recognized by those skilled in the art from the present disclosure that the holding bins 50, 60 can be omitted, if desired, and the production lines for the first and second feed stocks 40', 50 can be run concurrently and the feed stocks 40', 50 can be delivered directly to the scales 62, 64, in order to eliminate the need for stock piling either the first or second feed stock 40', 50. However, as a practical matter, it is necessary to have a supply of both of the first and second feed stocks 40', 50 on hand to make up for shortages of materials coming off of either line, as well as to allow for custom blends of the first and second feed stocks 40', 50 to be made at any given time. In the event that sized rubber material is being produced on site, holding bin 70 could also be omitted, subject to similar demands to have sufficient inventory of sized rubber feed stock 70' available to meet production demand.

The reformulated alternative daily cover material formed by the above process can be applied readily in a compacted 6-inch layer as required by the municipal waste management regulations in many areas in order to isolate municipal waste from contact with vectors. The alternative daily cover material has no odor associated with it and tends to absorb as well as suppress odors associated with municipal waste based on the use of the recycled construction and demolition debris in the alternative daily cover material. The high percentage of crushed concrete, brick, as well as cleanfill in the alternative daily cover material ensures the durability of the product and allows motor vehicles to successfully maneuver over the alternative daily cover.

For an alternative intermediate cover, the first and second feed stocks 40' and 50 are ground to a maximum particle size of less than 1 inch, and more preferably to a maximum particle size of ½ to ¾ inch, and are blended and mixed in approximately the same proportions as noted above. Oversize particles can be screened off by the disc screen 43, which can be set up to only allow material that is ¾ inch or smaller to pass through, and the oversize material can be reprocessed, as noted above. Preferably, the clean fill used includes a larger soil component as compared to aggregate which would be more desirable for the alternate daily cover material. Clean fill with a large soil content can be kept separate in the clean fill tipping area, and a sufficient amount can be included in the alternative intermediate cover mixture to sustain vegetation.

The reformulated barrier material is used just as is the alternative daily cover material or even conventional soil daily covers. A layer of at least six inches compacted depth is uniformly spread over the landfill additions for the day to capture and contain any loose debris and to limit access by animals to the fill material. The homogeneous mixture of crumb rubber and the ground C&D debris diffuses gasses emanating from the landfill below thereby assuring more thorough interaction with the rubber material in the mixture and thus more effective capture of any hydrogen sulfide emanating from the alternative cover material.

Naturally, the invention is not limited to the foregoing embodiments, but it can also be modified in many ways without departing from the basic concepts. Changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

We claim:

1. A method for producing an odor absorbing product for use as a reformulated alternative cover material for landfills using recycled material comprising the steps of:
    (a) receiving construction and demolition debris in a first area;
    b) receiving clean fill in a second area;
    (c) receiving sized rubber material in a third area;
    (d) positive sorting at least one of masonry products, concrete, bricks, cinder block, rocks, and asphalt from the construction and demolition debris from the first area;
    (e) positive sorting a remaining portion of the construction and demolition debris from step (d) to remove recyclable materials including at least one of cardboard, wood, fiber, ferrous metal and non-ferrous metal;
    (f) negative sorting a remainder of the construction and demolition debris from step (e) to remove materials other than wood, roofing material, and insulating board to form a first feed stock component;
    (g) grinding the first feed stock component to a desired particle size of up to approximately six inches to form a first feed stock;
    (h) mixing the at least one of the masonry products, concrete, bricks, cinder block, rocks and asphalt with the clean fill from the second area to form a second feed stock component;
    (i) grinding the second feed stock component to a desired particle size of up to approximately six inches to form a second feed stock;
    (j) blending the first and second feed stocks in a proportion of approximately 2:1 to approximately 5:1 by weight to form an alternative cover material for landfills using recycled material to produce an alternative cover material; and
    (k) blending a feed of sized rubber material into the alternative cover material in a proportion of greater than zero and less than approximately 50 percent by volume to form a permeable, hydrogen sulfide absorbing alternative cover material.

2. The method of claim 1, wherein the proportion of the sized rubber material added to the alternative cover material is in a range between approximately 3 percent and approximately 8 percent.

3. The method of claim 1, wherein the proportion of the sized rubber material added to the alternative cover material is based on an estimate of sulfate-containing material contained in the first feed stock component.

4. The method of claim 1, wherein the proportion of the sized rubber material added to the initial volume is based on an estimate of sulfate-containing material contained in a landfill upon which the reformulated alternative cover material is to be used.

5. The method of claim 1, wherein the proportion of the sized rubber material added to the initial volume is based on an perceived effectiveness of the reformulated alternative cover material and is in a range between approximately 1 percent and approximately 30 percent of the initial volume.

6. A reformulated alternative cover material for suppressing hydrogen sulfide release from landfills using recycled construction and demolition debris comprising:
 a first feed stock comprising construction and demolition debris from which materials other than wood, roofing material, wallboard material, plaster, plaster board, and insulating board have been removed, the first feed stock being ground to a first desired particle size;
 a second feed stock comprising at least one of masonry products, concrete, bricks, cinder block, rocks, asphalt that has been removed from the construction and demolition debris, the second feed stock being a ground to a second desired particle size; and
 a third feed stock of sized rubber material, the third feed stock ground to a third desired particle size;
 wherein the first and second feed stocks are blended in proportions of approximately 2:1 to approximately 5:1 by weight to create an initial volume of alternative cover material, and the third feed stock is added to the initial volume in a proportion greater than zero and less than approximately 50 percent of the initial volume to maintain permeability of the alternative cover material while absorbing hydrogen sulfide gas passing through the alternative cover material.

7. The reformulated alternative cover material of claim 6, wherein the proportion of the third feed stock added to the initial volume is based on an estimate of wallboard material, plaster, and plaster board contained in the first feed stock.

8. The reformulated alternative cover material of claim 6, wherein the proportion of the third feed stock added to the initial volume is based on an estimate of calcium sulfate containing material contained in a landfill upon which the reformulated alternative cover material is to be used.

9. The reformulated alternative cover material of claim 6, wherein the proportion of the third feed stock added to the initial volume is in a range between approximately 3 percent and approximately 8 percent of the initial volume.

10. The reformulated alternative cover material of claim 6, wherein the proportion of the third feed stock added to the initial volume is based on a perceived effectiveness of the reformulated alternative cover material and is in a range between approximately 1 percent and approximately 30 percent of the initial volume.

* * * * *